US012795604B2

(12) United States Patent
Xu et al.

(10) Patent No.: US 12,795,604 B2
(45) Date of Patent: Nov. 10, 2026

(54) SELECTING RESOURCES FOR MOBILE TERMINATED SMALL DATA TRANSMISSION (MT-SDT) IN A WIRELESS NETWORK

(71) Applicant: Apple Inc., Cupertino, CA (US)

(72) Inventors: Fangli Xu, Beijing (CN); Alexander Sirotkin, Hod Hasharon (IL); Haijing Hu, Los Gatos, CA (US); Naveen Kumar R. Palle Venkata, San Diego, CA (US); Peng Cheng, Beijing (CN); Ping-Heng Kuo, London (GB); Ralf Rossbach, Munich (DE); Sethuraman Gurumoorthy, San Ramon, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 18/431,419

(22) Filed: Feb. 2, 2024

(65) Prior Publication Data

US 2024/0267883 A1 Aug. 8, 2024

Related U.S. Application Data

(60) Provisional application No. 63/443,188, filed on Feb. 3, 2023.

(51) Int. Cl.
*H04W 68/02* (2009.01)

(52) U.S. Cl.
CPC .................................. *H04W 68/02* (2013.01)

(58) Field of Classification Search
CPC .................................................... H04W 68/02
See application file for complete search history.

(56) References Cited

U.S. PATENT DOCUMENTS

| | | | | |
|---|---|---|---|---|
| 2023/0309081 | A1 * | 9/2023 | Huang | H04W 72/11 |
| 2025/0193959 | A1 * | 6/2025 | Chen | H04W 72/23 |

OTHER PUBLICATIONS

Ericsson, "MT-SDT Baseline," 3GPP TSG-RAN WG2 Meeting #120, R2-2211471, Toulouse, France, Nov. 14-18, 2022, 10 pages.
Lenovo, "Discussion on the MT-SDT procedure," 3GPP TSG-RAN WG2 Meeting #120, R2-2212120, Toulouse, France, Nov. 14-18, 2022, 4 pages.
LG Electronics Inc., "Discussion on MT-SDT," 3GPP TSG-RAN2#120, R2-2212581, Toulouse, France, Nov. 14-18, 2022, 2 pages.

(Continued)

*Primary Examiner* — Justin Y Lee
(74) *Attorney, Agent, or Firm* — Fish & Richardson P.C.

(57) ABSTRACT

Disclosed are methods, systems, and computer-readable medium to perform operations including receiving, by a user equipment (UE) from a base station of a wireless network, configuration information for selecting a resource for transmitting an uplink (UL) response message from the UE to the base station; receiving, by the UE in an RRC_INACTIVE state, a Mobile Terminated Small Data Transmission (MT-SDT) paging message from the base station; and transmitting, by the UE, the UL response message to the base station using at least one of (i) a first resource or the first resource type indicated by the MT-SDT paging message or (ii) a second resource selected based on the configuration information.

17 Claims, 10 Drawing Sheets

(56) References Cited

OTHER PUBLICATIONS

Oppo, "Initial considerations on MT-SDT," 3GPP TSG-RAN WG2 Meeting #120, R2-2211867, Toulouse, France, Nov. 14-18, 2022, 5 pages.

ZTE Corporation et al., "MT-SDT procedure," 3GPP TSG-RAN2#120, R2-2211532, Toulouse, France, Nov. 14-18, 2022, 4 pages.

ZTE Corporation, "New WI: Mobile Terminated-Small Data Transmission (MT-SDT) for NR Discussion," 3GPP TSG RAN Meeting #94e, RP-213583, Electronic Meeting, Dec. 6-17, 2021, 5 pages.

* cited by examiner

SELECTING RESOURCES FOR MOBILE TERMINATED SMALL DATA TRANSMISSION (MT-SDT) IN A WIRELESS NETWORK

CROSS REFERENCE TO RELATED APPLICATIONS

The present application claims priority of U.S. Provisional Application No. 63/443,188, filed on Feb. 3, 2023, entitled "SELECTING RESOURCES FOR MOBILE TERMINATED SMALL DATA TRANSMISSION (MT-SDT) IN A WIRELESS NETWORK," which is herein incorporated by reference in its entirety.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP).

SUMMARY

In accordance with one aspect of the present disclosure, a method includes: receiving, by a user equipment (UE) from a base station of a wireless network, configuration information for selecting a resource for transmitting an uplink (UL) response message from the UE to the base station; receiving, by the UE in an RRC_INACTIVE state, a Mobile Terminated Small Data Transmission (MT-SDT) paging message from the base station; determining, by the UE, whether the MT-SDT paging message includes an indication of at least one of a first resource or a first resource type for transmitting the UL response message; and performing at least one of: (i) upon determining that the MT-SDT paging message includes the indication and that one or more conditions have been satisfied, transmitting, by the UE, the UL response message to the base station using at least one of the first resource or the first resource type, (ii) upon determining that the MT-SDT paging message includes the indication and that one or more conditions for using the first resource have not been satisfied, transmitting, by the UE, the UL response message to the base station using a second resource that is selected based on configuration information, or (iii) upon determining that the MT-SDT paging message does not include the indication, transmitting, by the UE, the UL response message to the base station using the second resource selected based on the configuration information.

Implementations of this aspect can include one or more of the following features.

In some implementations, at least one of the first resource or the first resource type can be one of: a legacy Random Access Channel (RACH) resource, a RACH resource specific to Small Data Transmission (RA-SDT), or a Configured Grant resource specific to Small Data Transmission (CG-SDT).

In some implementations, the second resource can be one of: a legacy Random Access Channel (RACH) resource, a RACH resource specific to Small Data Transmission (RA-SDT), a Configured Grant resource specific to Small Data Transmission (CG-SDT), or a resource for transmitting data from the UE to the base station using Mobile-Originated Small Data Transmission (MO-SDT).

In some implementations, the configuration information can be received by the UE from the base station via RRC dedicated signaling.

In some implementations, the configuration information can be received by the UE from the base station via RRC broadcast signaling.

In some implementations, the configuration information can be received from the base station via RRC dedicated signaling, and the configuration information can include an indication to select a Configured Grant resource specific to Small Data Transmission (CG-SDT) as the second resource.

In some implementations, the configuration information can be received from the base station via RRC broadcast signaling, and the configuration information can include an indication to select a legacy Random Access Channel (RACH) resource as the second resource.

In some implementations, the MT-SDT paging message can include the indication of the first resource, and the one or more conditions can include a first condition that the first resource is available.

In some implementations, the MT-SDT paging message can include the indication of the first resource type, and the one or more conditions can include a second condition that a resource of the first resource type is available.

In some implementations, the configuration information can include an indication that the UE select the second resource based on a quality of a Synchronization Signal Block (SSB) associated with the second resource.

In some implementations, the configuration information can include an indication that the UE select the second resource based on a priority of resource types.

In some implementations, according to the priority of resource types, a Configured Grant resource specific to Small Data Transmission (CG-SDT) is prioritized over a legacy Random Access Channel (RACH) resource.

In some implementations, according to the priority of resource types, when the MT-SDT paging message triggers MT-SDT only, a legacy Random Access Channel (RACH) resource is selected.

In some implementations, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

In some implementations, the method can be performed by a user equipment (UE).

In some implementations, the method can be performed by at least one baseband processor.

In some implementations, the configuration information can include an indication that the UE select a legacy Random Access Channel (RACH) resource as the second resource.

In another aspect, a method includes: receiving, by a user equipment (UE) from a base station of a wireless network, configuration information for selecting a resource for transmitting an uplink (UL) response message from the UE to the base station; receiving, by the UE in an RRC_INACTIVE state, a Mobile Terminated Small Data Transmission (MT-SDT) paging message from the base station; and transmitting, by the UE, the UL response message to the base station using a first resource that is selected based on configuration information.

Implementations of this aspect can include one or more of the following features.

In some implementations, the MT-SDT paging message does not indicate a resource or a resource type for transmitting the UL response message.

In some implementations, the first resource can be one of: a legacy Random Access Channel (RACH) resource, a RACH resource specific to Small Data Transmission (RA-SDT), a Configured Grant resource specific to Small Data Transmission (CG-SDT), or a resource for transmitting data from the UE to the base station using Mobile-Originated Small Data Transmission (MO-SDT).

In some implementations, the configuration information can be received by the UE from the base station via RRC dedicated signaling.

In some implementations, the configuration information can be received by the UE from the base station via RRC broadcast signaling.

In some implementations, the configuration information can include an indication that the UE select the first resource based on a quality of a Synchronization Signal Block (SSB) associated with the first resource.

In some implementations, the configuration information can include an indication that the UE select the first resource based on a priority of resource types.

In some implementations, the configuration information can include an indication that the UE select a legacy Random Access Channel (RACH) resource as the first resource.

In another aspect, a method includes: transmitting, by a base station of a wireless network to the user equipment (UE), configuration information for selecting a resource for transmitting an uplink (UL) response message from the UE to the base station; transmitting, by the base station to the UE, a Mobile Terminated Small Data Transmission (MT-SDT) paging message, wherein the UE is in an RRC_INACTIVE state; and receiving, by the base station, the UL response message using a resource that is selected by the UE based on at least one of the configuration information or the MT-SDT paging message.

Implementations of this aspect can include one or more of the following features.

In some implementations, the method can further include, upon receiving the UL response message, transmitting, from the base station, data to the UE using MT-SDT.

In some implementations, the selected resource can be one of: a legacy Random Access Channel (RACH) resource, a RACH resource specific to Small Data Transmission (RA-SDT), a Configured Grant resource specific to Small Data Transmission (CG-SDT), or a resource of transmitting data from the UE to the base station using Mobile-Originated Small Data Transmission (MO-SDT).

In some implementations, the configuration information can be transmitted by the base station to the UE via RRC dedicated signaling.

In some implementations, the configuration information can be transmitted by the base station to the UE via RRC broadcast signaling.

In some implementations, the configuration information can be received from the base station via RRC dedicated signaling, and the configuration information can include an indication to select a Configured Grant resource specific to Small Data Transmission (CG-SDT) as the first resource.

In some implementations, the configuration information can be received from the base station via RRC broadcast signaling, and the configuration information can include an indication to select a legacy Random Access Channel (RACH) resource as the first resource.

In some implementations, the MT-SDT paging message can include an indication of a first resource.

In some implementations, the MT-SDT paging message can include the indication of a first resource type.

In some implementations, according to the priority of resource types, a Configured Grant resource specific to Small Data Transmission (CG-SDT) is prioritized over a legacy Random Access Channel (RACH) resource.

In some implementations, according to the priority of resource types, when the MT-SDT paging message triggers MT-SDT only, a legacy Random Access Channel (RACH) resource is selected.

In some implementations, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

In some implementations, the method can be performed by a user equipment (UE).

In some implementations, the method can be performed by at least one baseband processor.

In some implementations, the configuration information can include an indication that the UE select the resource for transmitting the UL response message based on a quality of a Synchronization Signal Block (SSB) associated with the selected resource.

In some implementations, the configuration information can include an indication that the UE select the resource for transmitting the UL response message based on a priority of resource types.

In some implementations, the configuration information can include an indication that the UE select a legacy Random Access Channel (RACH) resource for transmitting the UL response message.

In another aspect, a method includes: receiving a Mobile Terminated Small Data Transmission (MT SDT) paging message from a base station of a wireless network; determining a resource for transmitting an uplink (UL) response message to the base station, based on at least one of: a Configured Grant resource specific to Small Data Transmission (CG-SDT), a legacy Random Access Channel (RACH) resource, or a Random Access Small Data Transmission (RA-SDT) resource; and transmitting the UL response message to the base station using the determined resource.

Implementations of this aspect can include one or more of the following features.

In some implementations, determining the resource can include: determining that the CG-SDT resource is configured; and prioritizing the CG-SDT resource over the RACH resource as the resource.

In some implementations, determining the resource can include, responsive to determining that MT-SDT paging message triggers MT-SDT only and that the CG-SDT resource is not configured, determining that the RACH resource is the resource.

In some implementations, determining the resource can include, responsive to determining that MT-SDT paging message triggers MT-SDT, determining that the CG-SDT resource or the RA-SDT resource is the resource.

In some implementations, the method can also include receiving, from the base station, configuration information comprising in indication of the CG-SDT resource via RRC dedicated signaling.

In some implementations, the method can also include receiving, from the base station, configuration information comprising in indication of the RACH configuration via RRC broadcast signaling.

In some implementations, the method can be performed by a user equipment (UE).

In some implementations, the method can be performed by at least one baseband processor.

In another aspect, a method includes: transmitting a MT SDT paging message to a user equipment (UE); receiving, from the UE, an uplink (UL) response message using a resource, wherein the resource is determined based on at least one of: a Configured Grant resource specific to Small Data Transmission (CG-SDT), a legacy Random Access Channel (RACH) resource, or a Random Access Small Data Transmission (RA-SDT) resource; and transmitting data to the UE based on the UL response message.

Implementations of this aspect can include one or more of the following features.

In some implementations, the CG-SDT resource can be configured, and the CG-SDT resource can be prioritized over the RACH resource as the resource.

In some implementations, the MT-SDT paging message can trigger MT-SDT only, the CG-SDT resource is not configured, and the RACH resource can be determined to be the resource.

In some implementations, the MT-SDT paging message can trigger MT-SDT, and the CG-SDT resource or the RA-SDT resource can be determined to be the resource.

In some implementations, the method can include transmitting, to the UE device, configuration information including in indication of the CG-SDT resource via RRC dedicated signaling.

In some implementations, the method can include transmitting, to the UE device, configuration information including in indication of the RACH configuration via RRC broadcast signaling.

In some implementations, the method can be performed by a base station.

In some implementations, the method can be performed by at least one baseband processor.

In another aspect, an apparatus includes one or more baseband processors configured to perform any of the operations described herein.

In another aspect, a method includes any of the operations described herein.

In another aspect, an apparatus includes one or more baseband processors configured to perform any of the operations(s) described herein.

In another aspect, a system includes one or processors and one or more storage devices on which are stored instructions that are operable, when executed by the one or more processors, to cause the one or more processors to perform any of the operations(s) described herein.

In another aspect, a non-transitory computer storage medium is encoded with instructions that, when executed by one or more processors, cause the one or more processors to perform any of the operations(s) described herein.

The details of one or more embodiments of these systems and methods are set forth in the accompanying drawings and the description below. Other features, objects, and advantages of these systems and methods will be apparent from the description and drawings, and from the claims.

DETAILED DESCRIPTION

This disclosure sets forth various techniques for selecting resources by a user equipment (UE) for various aspects of Mobile Terminated Small Data Transmission (MT-SDT) in a wireless network, such as a cellular network.

In an example implementation, a base station of a wireless network transmits a paging message (e.g., a MT-SDT paging message) to a UE indicating that data can be transmitted from the base station to the UE according to MT-SDT. Upon receiving the paging message, the UE selects one or more resources for transmitting an uplink response message to the base station (e.g., to indicate that the UE is available to receive data using MT-SDT). In some implementations, the UE can select a resource based on configuration information signaled by the base station to the UE, or based on resource information included in the MT-SDT paging message, and/or other considerations.

Figure 1:
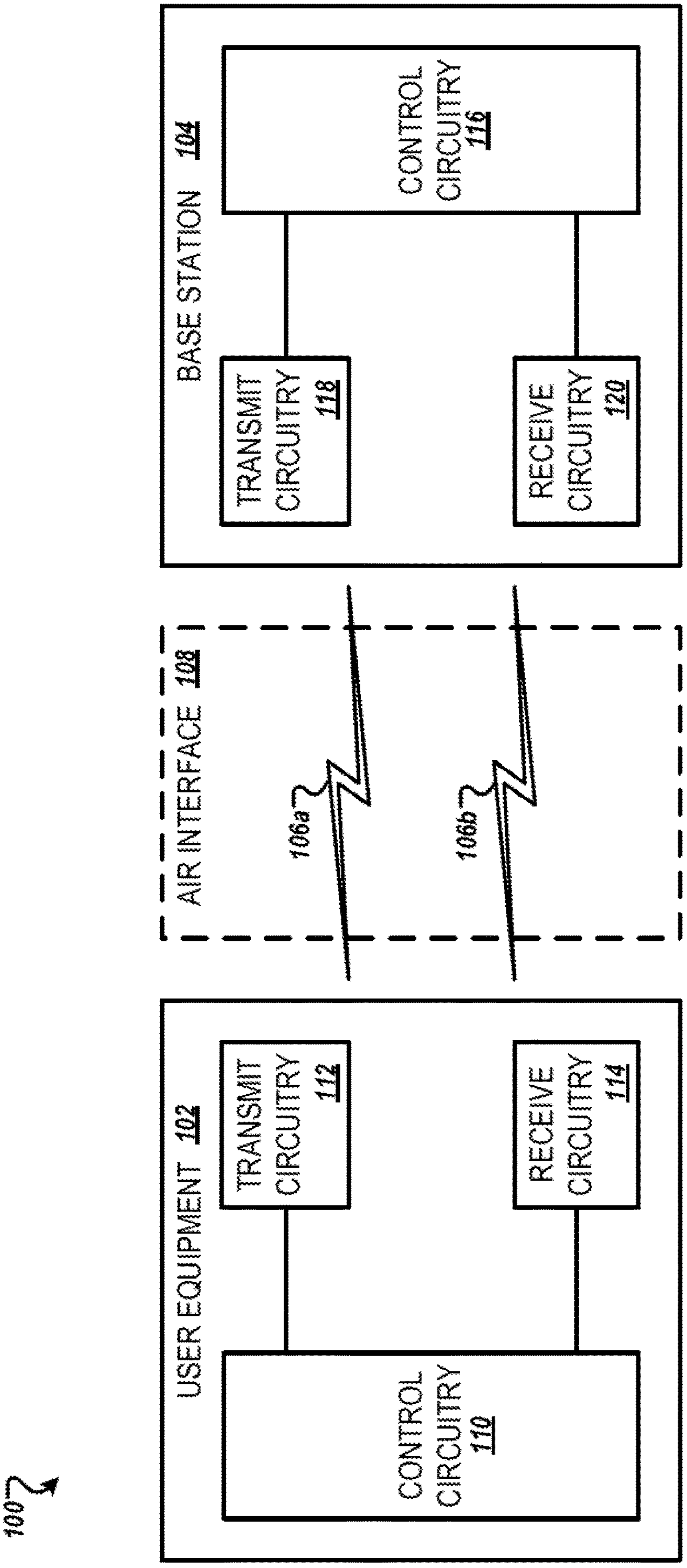
FIG. 1 illustrates an example wireless network.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be an E-UTRA (Evolved Universal Terrestrial Radio Access)-NR Dual Connectivity (EN-DC) network, or a NR-EUTRA Dual Connectivity (NE-DC) network. However, the wireless network 100 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE.

The transmit circuitry 112 can perform various operations described in this specification. Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The transmit circuitry 118 may transmit downlink physical channels includes of a plurality of downlink subframes. The receive circuitry 120 may receive a plurality of uplink physical channels from various UEs, including the UE 102.

In FIG. 1, the one or more channels 106A, 106B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

In some implementations, the UE 102 and the base station 104 can exchange data with one another according to a legacy data transmission procedure, whereby the UE 102 is in a Radio Resource Control (RRC) "connected" state (e.g., "RRC_CONNECTED" state) when transmitting data to and/or receiving data from the base station 104. For example, the UE 102 can initially be in an RRC "idle" or "inactive" state (e.g., "RRC_IDLE" state or "RRC_INACTIVE" state). Upon determining that data is to be transferred from the base station 104 to the UE 102 according to a legacy data transmission procedure, the UE 102 can transition to the RRC_CONNECTED state and receive the data from the UE 102 while in the RRC_CONNECTED state. Similarly, upon determining that data is to be transferred from the UE 102 to the base station 104 according to a legacy data transmission procedure, the UE 102 can likewise transition to the RRC_CONNECTED state and transmit the data to the base station 104 while in the RRC_CONNECTED state. Upon completion of the data exchange, the UE 102 can remain in the RRC_CONNECTED state, or transition back to the RRC_IDLE state or RRC_INACTIVE state (e.g., upon being released back into the RRC_IDLE state or RRC_INACTIVE state by the base station 104).

In some implementations, the UE 102 and the base station 104 can exchange data with one another according to a Small Data Transmission (SDT) procedure, whereby the UE 102 is in the RRC_INACTIVE state when transmitting data to and/or receiving data from the base station 104. For example, the UE 102 can initially be in the RRC_INACTIVE state. Upon determining that data is to be transferred from the base station 104 to the UE 102 according to a SDT procedure, the UE 102 can remain in the RRC_INACTIVE while receiving the data from the base station 104 (e.g., without transitioning into the RRC_CONNECTED state). Similarly, upon determining that data is to be transferred from the UE 102 to the base station 104 according to a SDT procedure, the UE 102 can likewise remain in the RRC_INACTIVE while transmitting the data to the base station 104 (e.g., without transitioning into the RRC_CONNECTED state). In some implementations, the transmission of data from the UE 102 to the base station 104 using SDT (e.g., uplink SDT) may be referred to as Mobile Originated Small Data Transmission (MO-SDT). In some implementations, the transmission of data from the base station 104 to the UE 102 to the base station 104 using SDT (e.g., downlink SDT) may be referred to as Mobile Terminated Small Data Transmission (MT-SDT).

Data transmission using SDT can be beneficial, for example, in enabling data to be exchanged between the UE 102 and the base station 104 in a more efficient manner (e.g., compared to data transmission using a legacy process). For example, certain resources (e.g., network resources, computation resources, memory resources, etc.) may be expended by the UE 102 and/or the base station 104 in transitioning and/or maintaining the UE 102 in a RRC_CONNECTED state. This resource overhead can be eliminated or otherwise reduced by transmitting exchanging data using SDT instead (e.g., by avoiding or otherwise reducing the frequency by which the UE 102 operates in an RRC_CONNECTED state).

Figure 2:
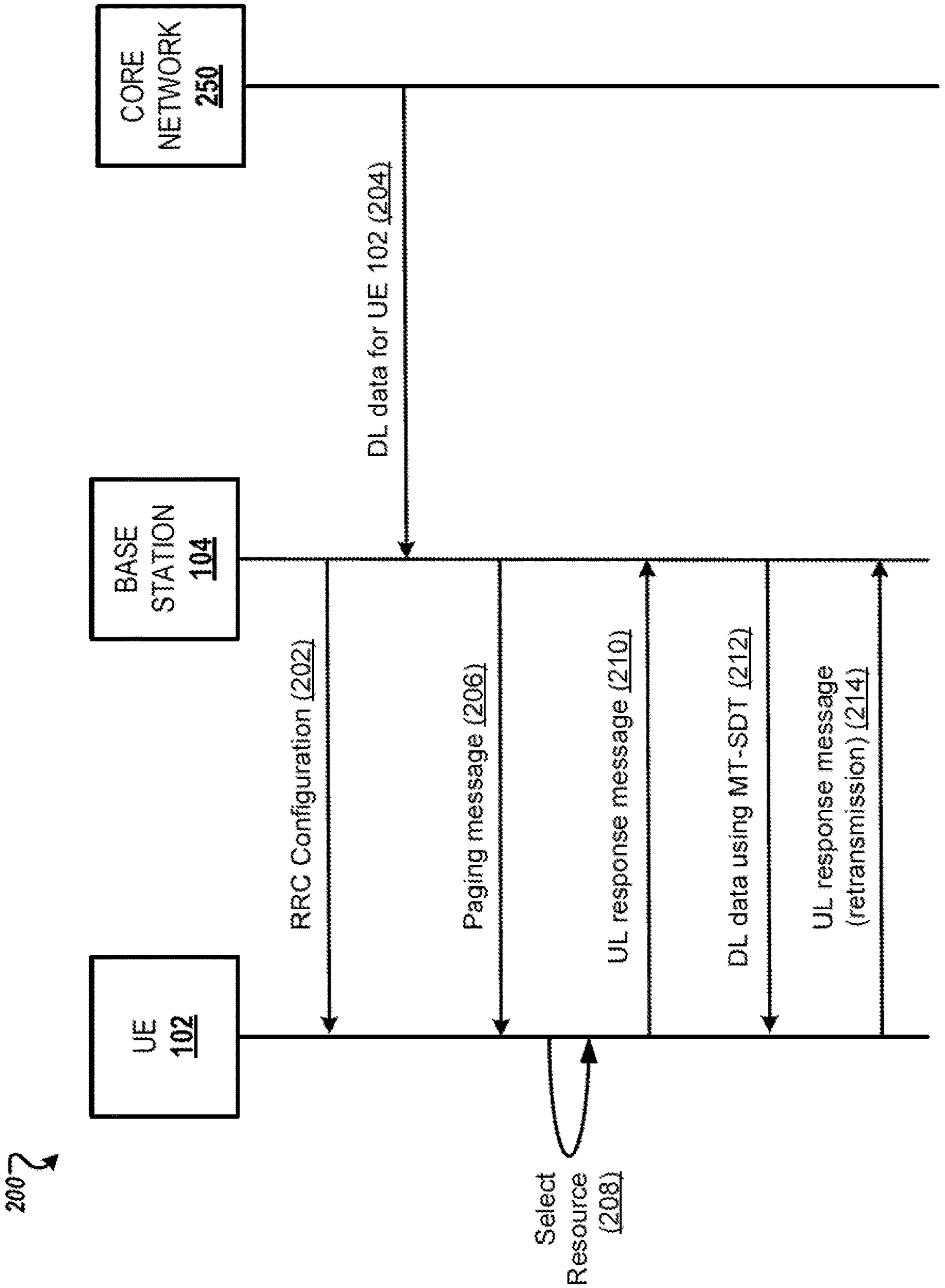
FIG. 2 illustrates an example process for initiating and performing Mobile Terminated Small Data Transmission (MT-SDT) between a user equipment (UE) and the base station.

FIG. 2 shows an example process 200 for initiating and performing SDT (e.g., MT-SDT) between the UE 102 and the base station 104.

According to the process 200, the base station transmits RRC configuration information to the UE 102 (102). The RRC configuration information can include information pertaining to initiating and performing SDT (e.g., MT-SDT and/or MO-SDT).

In some implementations, the RRC configuration information can include information indicating the resource(s) and/or types of resource(s) that the UE 102 should select while performing aspects of SDT. For example, the RRC configuration information can indicate the resource(s) and/or types of resource(s) that the UE 102 can select to transmit a uplink response message to the base station 104 in response to a MT-SDT paging message (e.g., as described in further detail below).

In some implementations, resources can be include resources in the network physical layer (e.g., "PHY") in the time domain/frequency domain, the code domain, or a combination thereof.

In some implementations, the RRC configuration information can include information indicating the process that can be performed by the UE 102 to select resource(s) for performing aspects of SDT. For example, the RRC configuration information can indicate the processes that can be performed by the UE 102 to select resource(s) to transmit a uplink response message to the base station 104 in response to a MT-SDT paging message (e.g., as described in further detail below).

Further, the base station 104 receives downlink data intended for transmission to the UE 102 (204). As an example, the downlink data can be received from a Core Network (CN) of a wireless network. In some implementations, the downlink data can be data provided to the CN by another device or system of the wireless network (e.g., another UE, base station, or any other system or device of the wireless network) for delivery to the UE 102.

Upon receiving the downlink data, the base station 104 identifies the corresponding UE 102 (e.g., the intended recipient of the downlink data), and transmits a paging message to the UE 102 (206). The paging message indicates that data is available for transmission from the base station 104 to the UE 102, and that the data can transmitted via MT-SDT. In some implementations, the paging message may be referred to as a MT-SDT paging message. In some implementations, the UE 102 can receive the paging message 204 while in a RRC_INACTIVE or RRC_IDLE state.

Upon receiving the paging message, the UE 102 selects a resource (or multiple resources) for responding to the MT-SDT paging message (208). In some implementations, the UE can make a selected based on configuration information signaled by the base station 104 to the UE 102 (e.g., via RRC configuration information), resource information included in the MT-SDT paging message, and/or other considerations.

In some implementations, the UE 102 can select resource(s) according to a legacy Random Access Channel (RACH) procedure.

In some implementations, the UE 102 can select one or more Random Access Small Data Transmission (RA-SDT) resources.

In some implementations, the UE 102 can select one or more Configured Grant Small Data Transmission (CG-SDT) resources.

Example processes for selecting resource(s) are described in further detail below.

Upon selecting a resource (or resources), the UE 102 transmits an uplink response message to the base station 104 using the selected resource(s) (210). As an example, the uplink response message can indicate that the UE 102 is available to receive data using MT-SDT (e.g., while the UE 102 is an RRC_INACTIVE state). In some implementations, the uplink response message can indicate one or more resources that are available for receiving the data using MT-SDT. Further, the UE 102 performs a MT-SDT procedure in preparation for receiving data from the base station 104. As a part of the MT-SDT procedure, the UE 102 can transition to (or remain in) a RRC_INACTIVE state.

Upon receiving the uplink resource message, the base station 104 transmits the downlink data to the UE 102 using MT-SDT (block 212). During the transmission of the downlink data, the UE 102 can remain in an RRC_INACTIVE state (e.g., rather than transitioning into a RRC_CONNECTED state).

In some implementations, the UE 102 can also retransmit the uplink resource message to the base station 104 one or more times (214). In some implementations, the UE 102 can retransmit the uplink resource message using the same resource(s) and/or same resource type(s) that were used to transmit the original uplink response message. In some implementations, the UE 102 can retransmit the uplink resource message using different resource(s) and/or different resource type(s) than those that were used to transmit the original uplink response message.

Figure 3:
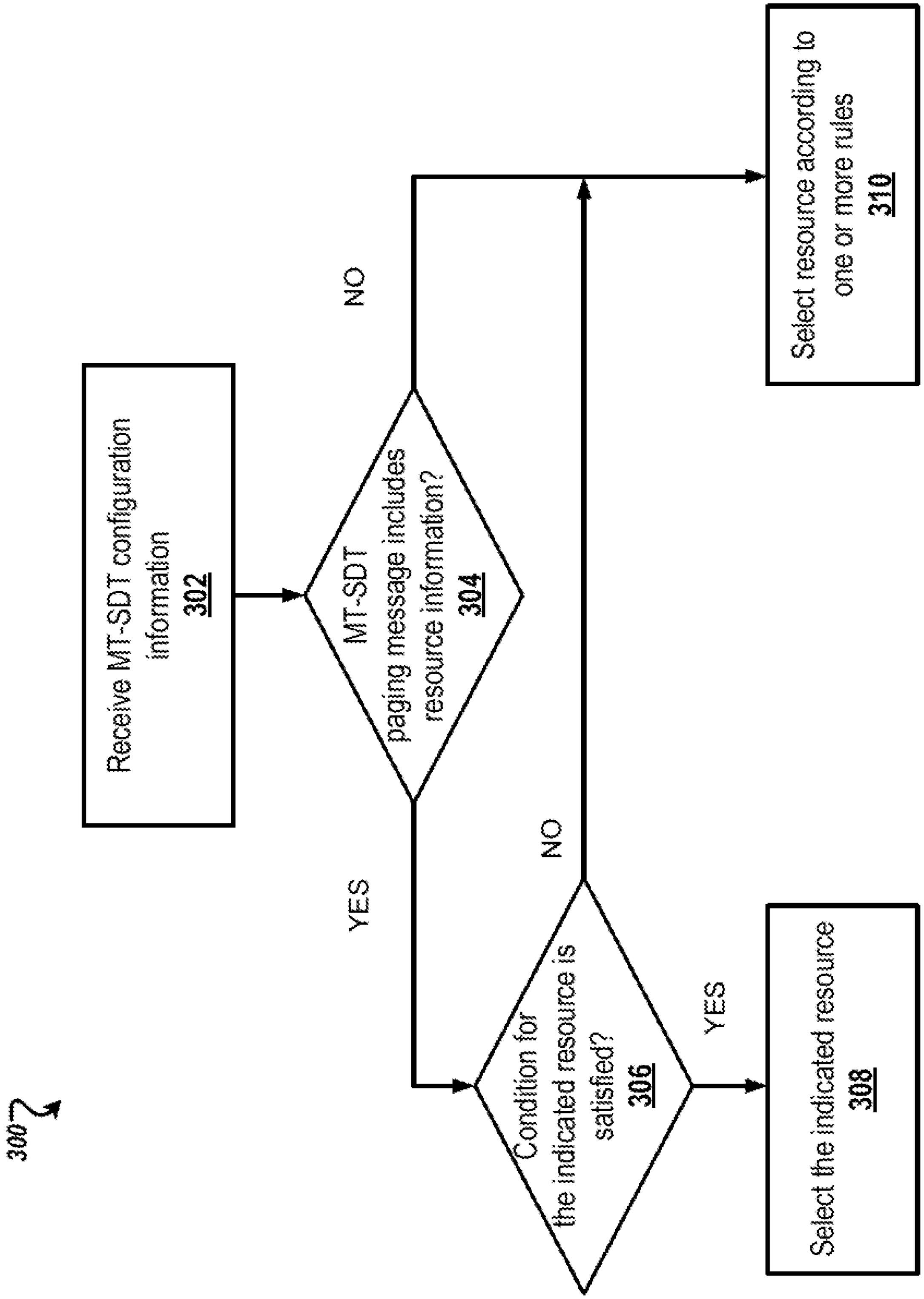
FIG. 3 illustrates an example process for determining whether to trigger MT-SDT by a UE.

FIG. 3 shows an example process 300 for selecting resource(s) for transmitting an uplink response message from the UE 102 to the base station 104 (e.g., in connection with 210 and/or 214 of FIG. 2).

According to the process 300, the UE 102 receives MT-SDT configuration information from the base station 104 (302).

In some implementations, at least some of the MT-SDT configuration information can be received from the base station 104 via RRC signaling (e.g., via RRC configuration information, as described with reference in 202 of FIG. 2).

As an example, in some implementations, at least some of the MT-SDT configuration information can be received from the base station 104 via RRC dedicated signaling (e.g., signaling that is specific to the UE 102). For example, at least some of the MT-SDT configuration information can be received from the base station 104 via an RRC Release with suspendCfg message, where the MT-SDT configuration information is specific to the UE 102.

As another example, in some implementations, at least some of the MT-SDT configuration information can be received from the base station 104 via broadcast signaling (e.g., signaling that is transmitted to multiple UEs concurrently). For example, at least some of the MT-SDT configuration information can be received from the base station 104 via System Information Block 1 (SIB1), where the MT-SDT configuration is specific to a particular cell of a wireless network.

In some implementations, the MT-SDT configuration information can indicate a Random Access Small Data Transmission (RA-SDT) resource that is specific to MT-SDT.

In some implementations, the MT-SDT configuration information can indicate a Configured Grant Small Data Transmission (CG-SDT) resource that is specific to MT-SDT.

In some implementations, the base station 104 can configure with the UE 102 the same resource for both MO-SDT and MT-SDT (e.g., if both MO-SDT and MT-SDT are configured).

In some implementations, the MT-SDT configuration information can refrain from indicating a resource that is specific to SDT. In these implementations, the UE 102 can select a legacy Random Access (RA) resource for transmitting the uplink response message to the base station 104.

According to the process 300, the UE 102 receives a paging message (e.g., a MT-SDT paging message) from the base station 104. This process can be similar to that described with reference to 204 of FIG. 2. Further, the UE 102 determines whether the MT-SDT paging message include resource information (block 304). As an example, the resource information can indicate particular resource(s) and/or resource type(s). As another example, the resource information can indicate particular condition(s) associated with those resource(s) and/or resource type(s).

If the MT-SDT paging message include resource information, the UE 102 determines whether the condition(s) for the indicated resource is satisfied (block 306). If so, the UE 102 selects the indicated resource and/or resource type (block 308).

However, if (i) the MT-SDT paging message does not include resource information or (ii) the condition(s) for the indicated resource are not satisfied, the UE 102 selects a resource according to one or more rules. In some implementations, the one or more rules can be preconfigured with the UE 102. In some implementations, the one or more rules can be configured by the wireless network (e.g., via the base station 104).

Additional operations pertain to the indication and/or selection of resources are described below.

Example Resource Indication Operations with Respect to the MT-SDT Paging Message:

As described above, the MT-SDT paging information can indicate resource information for selecting a resource for transmitting the uplink response message.

In some implementations, the base station 104 can indicate (e.g., via the MT-SDT paging message) a specific resource or type of resource for transmitting the uplink transmission message.

In some implementations, the base station 104 can indicate (e.g., via the MT-SDT paging message) whether the uplink response message should be transmitted via a Configured Grant (CG) resource or a Random Access (RA) resource.

In some implementations, if the base station 104 indicates a specific CG resource (and multiple CG resources are configured with the UE 102), the UE 102 can select the indicated CG resource if that resource is available.

In some implementations, if the base station 104 indicates a CG resource type generally, the UE 102 can select a nearest available CG resource.

In some implementations, if the base station 104 indicates a specific or dedicated RA resource, the UE 102 can select the indicated RA resource if that resource is available.

In some implementations, if the base station 104 indicates a RA-SDT or legacy RA resource type generally, the UE 102 can perform a RA resource selection from among the configured RA resources (e.g., within a configured "RA-config").

In some implementations, if the base station 104 indicates a RA resource type generally, the UE 102 can first select an available RA-SDT resource. If no RA-SDTs are available, the UE 102 can select a legacy RA resource.

In some implementations, if the base station 104 indicates a RA resource type generally, the UE 102 can prioritize selection of an available RA resource.

In some implementations, if the base station 104 indicates a RA resource type generally, and if uplink data has arrived, the UE 102 can prioritize selection of a RA-SDT resource.

In some implementations, the base station 104 can also indicate a MT-SDT triggered resource block (RB) information in the MT-SDT paging message. In these implementations, the UE can select resource(s) for the uplink transmission according to an association between the SDT resource and the RB.

Example Resource Selection Operations:

In some implementations, the UE 102 can initially determine whether to select a RA-SDT resource, a CG-SDT-CG, or a legacy RA resource. Further, if the base station 104 indicates a particular resource in the MT-SDT paging message or in the RRC configuration information, the UE 102 can prioritize selection of the indicated resource (if that resource is available).

Further, the condition(s) for evaluating the resource can be configured by the network (e.g., via the base station 104) or predefined. As an example, for a CG-SDT resource or a specific RA resource, a condition for selecting that resource may be that the quality of a Synchronization Signal Block (SSB) that is associated with the resource is greater than a particular threshold value. The UE 102 can select the resource if the condition is satisfied (e.g., if the quality of the SSB is greater than the threshold value), or refrain from selecting the source if the condition is not satisfied (e.g., if the quality of the SSB is not greater than the threshold value).

In some implementations, if multiple resource types are configured, the UE 102 can first select the resource type first according to a particular priority. As an example, the UE 102 can prioritize selecting CG-SDT resource, followed by RA-SDT resources, followed by legacy RA resources. If there are no available resources of the highest priority type, the UE 102 can select resources from the type having the next lower priority, and so forth until a resource type is selected. In some implementations, the priority of resource types can be configured by the network (e.g., via the base station 104). In some implementations, the priority of resource can be preconfigured with the UE 102. Although an example priority is described above, other priorities also can be used (e.g., a different priority for CG-SDT resources, RA-SDT resources, and legacy RA resources).

In some implementations, different resource selection processes and/or different resource type priorities can be used for different conditions. As an example, in some implementations, if there is only MT-SDT trigger, the UE 102 can select the resource in the legacy RACH configuration. As another example, if the triggered RB is associated with the RA-SDT resource or CG-SDT resource, the UE 102 can prioritize selecting the associated SDT resource.

In some implementations, if more than one MT-SDT-RB is configured and/or indicate, but are associated to the different resource types, the UE 102 can select the resource type within the associated resource type set according to one of several techniques. In some implementations, the UE 102 can select the resource according to a preconfigured processes. In some implementations, the UE 102 can prioritize the selection of certain types of resources (e.g., prioritize selection of a RA-SDT resource over a CG-SDT resource, or vice versa). In some implementations, the UE 102 can select a resource by identifying the MT-SDT-RB having the highest priority. In some implementations, the UE 102 can select the legacy RA resource.

Figure 4A:
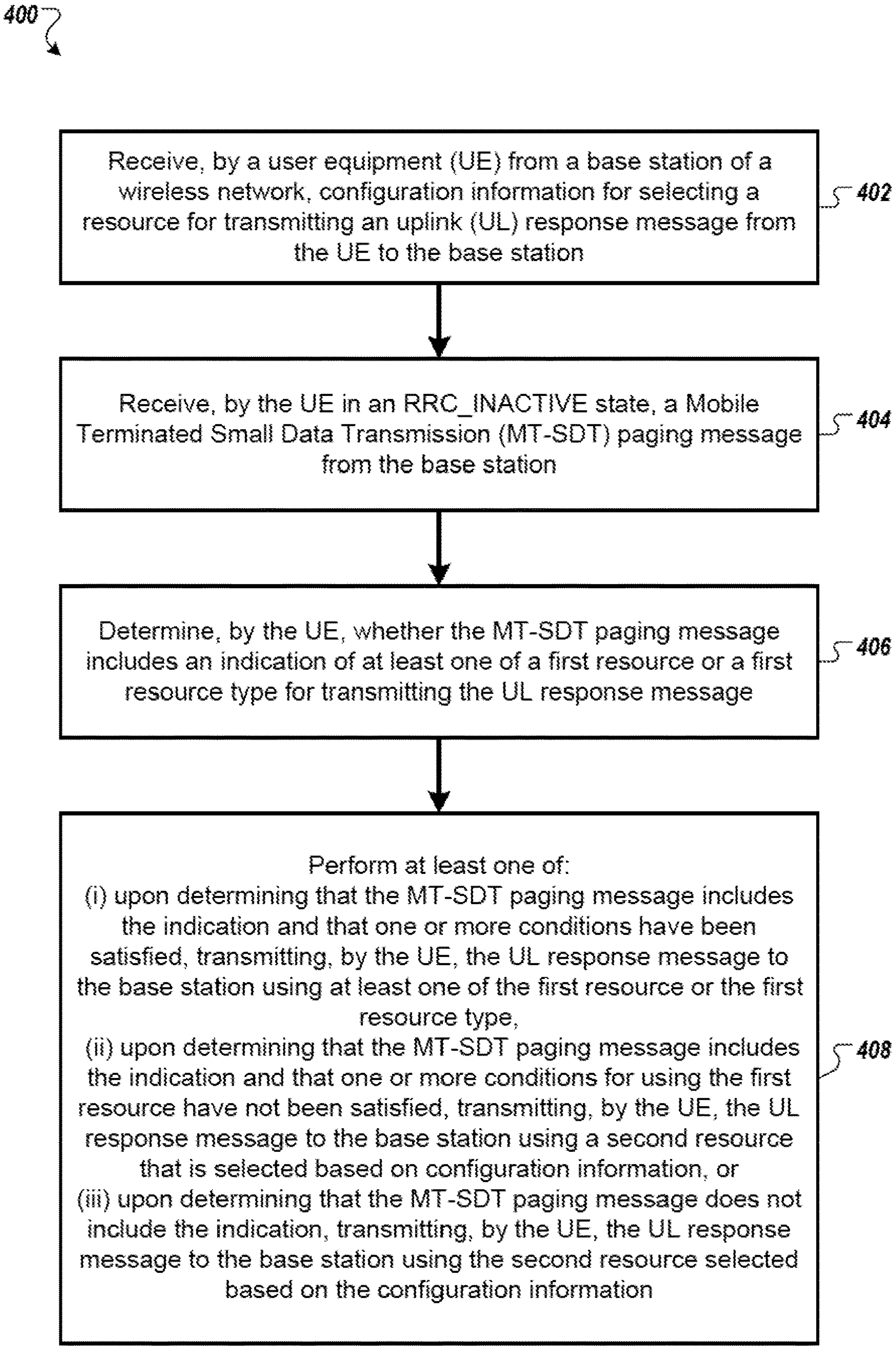
FIGS. 4A-4E illustrate flowcharts of example methods.

Example Methods:

FIG. 4A illustrates a flowchart of an example method 400. For clarity of presentation, the description that follows generally describes method 400 in the context of the other figures in this description. For example, method 400 can be performed, at least in part, by the UE 102 and/or UE 500 shown in FIGS. 1 and 5, respectively. It will be understood that method 400 can be performed, for example, by any suitable system, environment, software, hardware, or a combination of systems, environments, software, and hardware, as appropriate. In some implementations, various steps of method 400 can be run in parallel, in combination, in loops, or in any order.

According to the method 400, a UE receives, from a base station of a wireless network, configuration information for selecting a resource for transmitting an uplink (UL) response message from the UE to the base station (block 402).

In some implementations, the configuration information can be received by the UE from the base station via RRC dedicated signaling.

In some implementations, the configuration information can be received by the UE from the base station via RRC broadcast signaling.

Further, the UE receives, in an RRC_INACTIVE state, a Mobile Terminated Small Data Transmission (MT-SDT) paging message from the base station (block 404).

Further, the UE determines whether the MT-SDT paging message includes an indication of at least one of a first resource or a first resource type for transmitting the UL response message (block 406).

Further, the UE performs at least one of: (i) upon determining that the MT-SDT paging message includes the indication and that one or more conditions have been satisfied, transmitting, by the UE, the UL response message to the base station using at least one of the first resource or the first resource type, (ii) upon determining that the MT-SDT paging message includes the indication and that one or more conditions for using the first resource have not been satisfied, transmitting, by the UE, the UL response message to the base station using a second resource that is selected based on configuration information, or (iii) upon determining that the MT-SDT paging message does not include the indication, transmitting, by the UE, the UL response message to the base station using the second resource selected based on the configuration information (block 408).

In some implementations, at least one of the first resource or the first resource type can be one of: a legacy Random Access Channel (RACH) resource, a RACH resource specific to Small Data Transmission (RA-SDT), or a Configured Grant resource specific to Small Data Transmission (CG-SDT).

In some implementations, the second resource can be one of: a legacy Random Access Channel (RACH) resource, a RACH resource specific to Small Data Transmission (RA-SDT), a Configured Grant resource specific to Small Data Transmission (CG-SDT), or a resource for transmitting data from the UE to the base station using Mobile-Originated Small Data Transmission (MO-SDT).

In some implementations, the MT-SDT paging message can include the indication of the first resource. Further, the one or more conditions can include a first condition that the first resource is available.

In some implementations, the MT-SDT paging message can include the indication of the first resource type. Further, the one or more can include a second condition that a resource of the first resource type is available.

In some implementations, the configuration information can include an indication that the UE select the second resource based on a quality of a Synchronization Signal Block (SSB) associated with the second resource.

In some implementations, the configuration information can include an indication that the UE select the second resource based on a priority of resource types.

In some implementations, the configuration information can include an indication that the UE select a legacy Random Access Channel (RACH) resource as the second resource.

In some implementations, the configuration information can be received from the base station via RRC dedicated signaling, and the configuration information can include an indication to select a Configured Grant resource specific to Small Data Transmission (CG-SDT) as the second resource.

In some implementations, the configuration information can be received from the base station via RRC broadcast signaling, and the configuration information can include an indication to select a legacy Random Access Channel (RACH) resource as the second resource.

In some implementations, according to the priority of resource types, a Configured Grant resource specific to Small Data Transmission (CG-SDT) is prioritized over a legacy Random Access Channel (RACH) resource.

In some implementations, according to the priority of resource types, when the MT-SDT paging message triggers MT-SDT only, a legacy Random Access Channel (RACH) resource is selected.

In some implementations, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

In some implementations, the method can be performed by a user equipment (UE).

In some implementations, the method can be performed by at least one baseband processor.

Figure 4B:
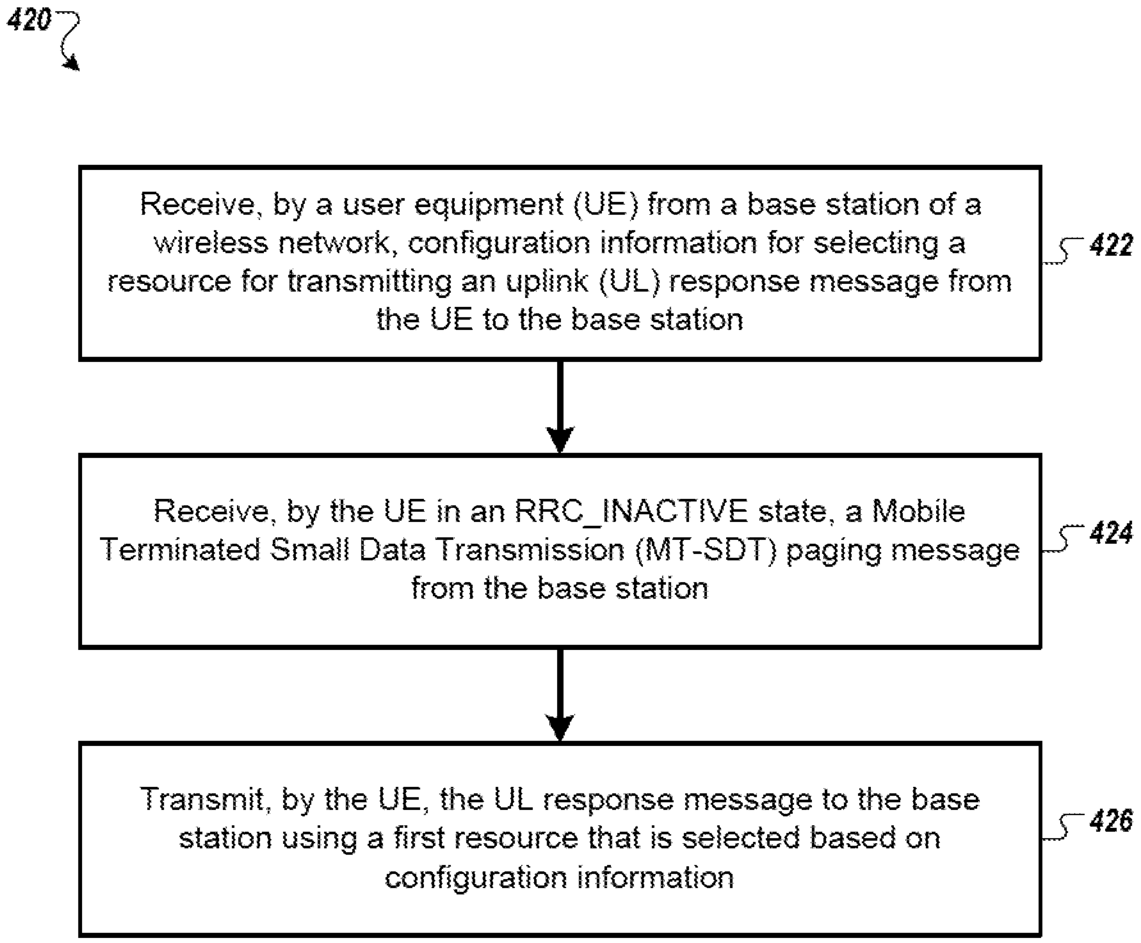

FIG. 4B illustrates a flowchart of an example method 420. For clarity of presentation, the description that follows generally describes method 420 in the context of the other figures in this description. For example, method 420 can be performed, at least in part, by the UE 102 and/or UE 500 shown in FIGS. 1 and 5, respectively. It will be understood that method 420 can be performed, for example, by any suitable system, environment, software, hardware, or a combination of systems, environments, software, and hardware, as appropriate. In some implementations, various steps of method 420 can be run in parallel, in combination, in loops, or in any order.

According to the method 420, a UE receives, from a base station of a wireless network, configuration information for selecting a resource for transmitting an uplink (UL) response message from the UE to the base station (block 422). In some implementations, the configuration information can be received by the UE from the base station via RRC dedicated signaling. In some implementations, the configuration information can be received by the UE from the base station via RRC broadcast signaling.

Further, the UE receives, in an RRC_INACTIVE state, a Mobile Terminated Small Data Transmission (MT-SDT) paging message from the base station (block 424). In some implementations, the MT-SDT paging message does not indicate a resource or a resource type for transmitting the UL response message.

Further, the UE transmits the UL response message to the base station using a first resource that is selected based on configuration information (block 426).

In some implementations, the first resource can be one of: a legacy Random Access Channel (RACH) resource, a RACH resource specific to Small Data Transmission (RA-SDT), a Configured Grant resource specific to Small Data Transmission (CG-SDT), or a resource for transmitting data from the UE to the base station using Mobile-Originated Small Data Transmission (MO-SDT).

In some implementations, the configuration information can include an indication that the UE select the first resource based on a quality of a Synchronization Signal Block (SSB) associated with the first resource.

In some implementations, the configuration information can include an indication that the UE select the first resource based on a priority of resource types.

In some implementations, the configuration information can include an indication that the UE select a legacy Random Access Channel (RACH) resource as the first resource.

Figure 4C:
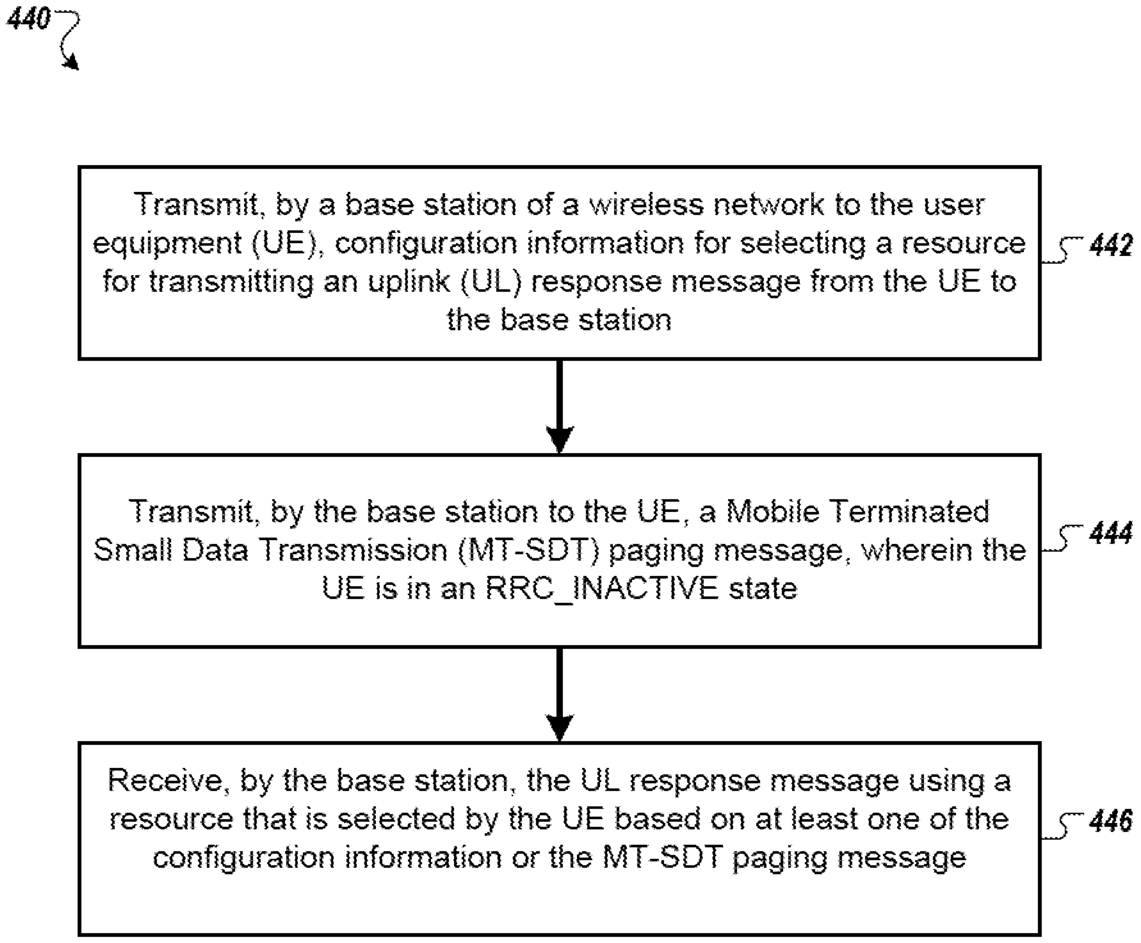

FIG. 4C illustrates a flowchart of an example method 440. For clarity of presentation, the description that follows generally describes method 440 in the context of the other figures in this description. For example, method 440 can be performed, at least in part, by the base station 104 and/or the access node 600 shown in FIGS. 1 and 6, respectively. It will be understood that method 440 can be performed, for example, by any suitable system, environment, software, hardware, or a combination of systems, environments, software, and hardware, as appropriate. In some implementations, various steps of method 440 can be run in parallel, in combination, in loops, or in any order.

According to the method 440, a base station transmits, to the user equipment (UE), configuration information for selecting a resource for transmitting an uplink (UL) response message from the UE to the base station (block 442).

In some implementations, the configuration information can be transmitted by the base station to the UE via RRC dedicated signaling.

In some implementations, the configuration information can be transmitted by the base station to the UE via RRC broadcast signaling.

Further, the base station transmits, to the UE, a Mobile Terminated Small Data Transmission (MT-SDT) paging message, wherein the UE is in an RRC_INACTIVE state (block 444).

Further, the base station receives the UL response message using a resource that is selected by the UE based on at least one of the configuration information or the MT-SDT paging message (block 446).

In some implementations, upon receiving the UL response message, the base station can transmit data to the UE using MT-SDT.

In some implementations, the selected resource can be one of: a legacy Random Access Channel (RACH) resource, a RACH resource specific to Small Data Transmission (RA-SDT), a Configured Grant resource specific to Small Data Transmission (CG-SDT), or a resource of transmitting data from the UE to the base station using Mobile-Originated Small Data Transmission (MO-SDT).

In some implementations, the MT-SDT paging message can include an indication of a first resource.

In some implementations, the MT-SDT paging message can include the indication of a first resource type.

In some implementations, the configuration information can include an indication that the UE select the resource for transmitting the UL response message based on a quality of a Synchronization Signal Block (SSB) associated with the selected resource.

In some implementations, the configuration information can include an indication that the UE select the resource for transmitting the UL response message based on a priority of resource types.

In some implementations, the configuration information can include an indication that the UE select a legacy Random Access Channel (RACH) resource for transmitting the UL response message.

In some implementations, the configuration information can be received from the base station via RRC dedicated signaling, and the configuration information can include an indication to select a Configured Grant resource specific to Small Data Transmission (CG-SDT) as the first resource.

In some implementations, the configuration information can be received from the base station via RRC broadcast signaling, and the configuration information can include an indication to select a legacy Random Access Channel (RACH) resource as the first resource.

In some implementations, according to the priority of resource types, a Configured Grant resource specific to Small Data Transmission (CG-SDT) is prioritized over a legacy Random Access Channel (RACH) resource.

In some implementations, according to the priority of resource types, when the MT-SDT paging message triggers MT-SDT only, a legacy Random Access Channel (RACH) resource is selected.

In some implementations, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

In some implementations, the method can be performed by a user equipment (UE).

In some implementations, the method can be performed by at least one baseband processor.

Figure 4D:
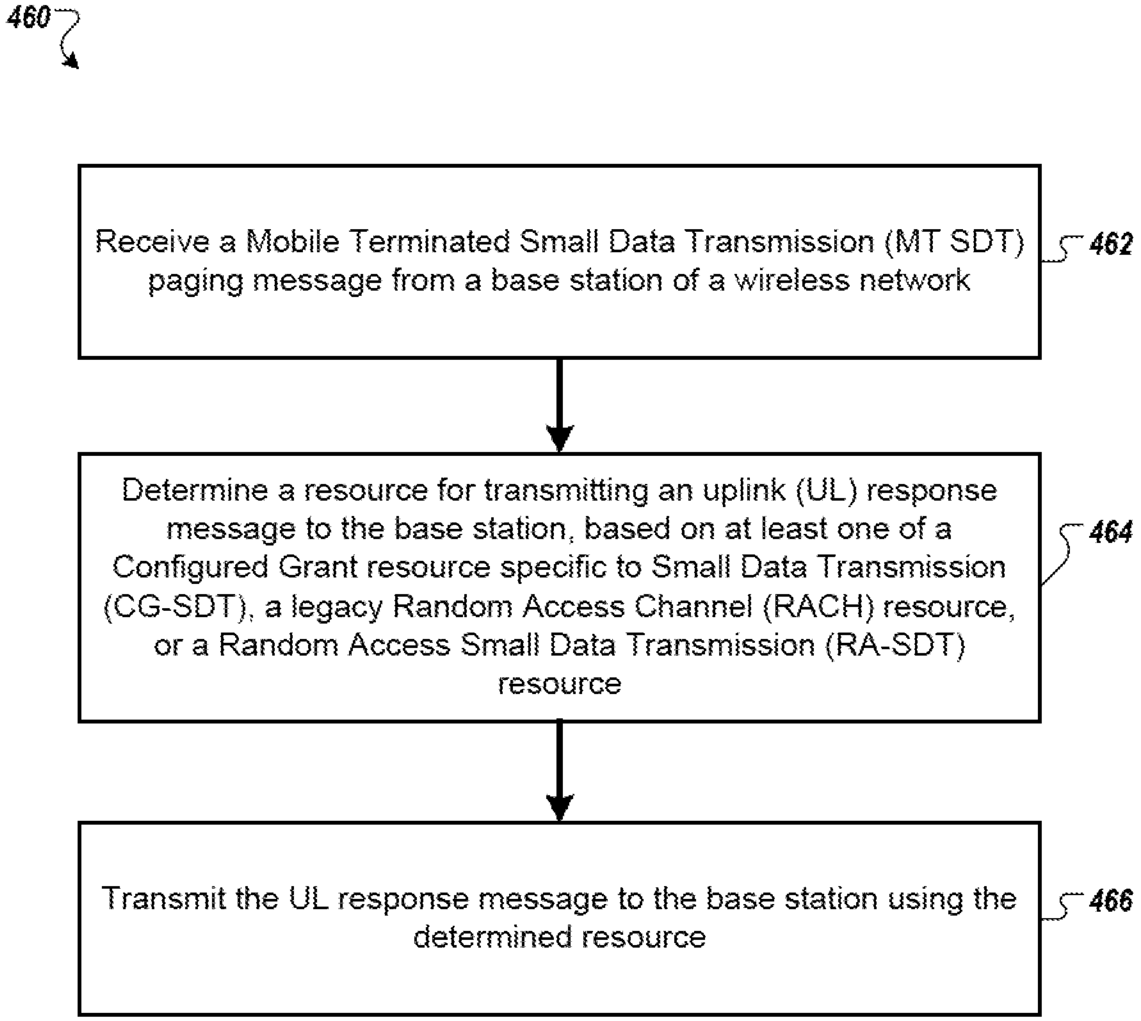

FIG. 4D illustrates a flowchart of an example method 460. For clarity of presentation, the description that follows generally describes method 460 in the context of the other figures in this description. For example, method 460 can be performed, at least in part, by the UE 102 and/or UE 500 shown in FIGS. 1 and 5, respectively. It will be understood that method 460 can be performed, for example, by any suitable system, environment, software, hardware, or a combination of systems, environments, software, and hardware, as appropriate. In some implementations, various steps of method 460 can be run in parallel, in combination, in loops, or in any order.

According to the method 460, a device receives a Mobile Terminated Small Data Transmission (MT SDT) paging message from a base station of a wireless network (block 462).

The device determines a resource for transmitting an uplink (UL) response message to the base station, based on at least one of a Configured Grant resource specific to Small Data Transmission (CG-SDT), a legacy Random Access Channel (RACH) resource, or a Random Access Small Data Transmission (RA-SDT) resource (block 464).

The device transmits the UL response message to the base station using the determined resource (block 468).

In some implementations, determining the resource can include determining that the CG-SDT resource is configured; and prioritizing the CG-SDT resource over the RACH resource as the resource.

In some implementations, determining the resource can include, responsive to determining that MT-SDT paging message triggers MT-SDT only and that the CG-SDT resource is not configured, determining that the RACH resource is the resource.

In some implementations, determining the resource can include, responsive to determining that MT-SDT paging message triggers MT-SDT, determining that the CG-SDT resource or the RA-SDT resource is the resource.

In some implementations, the method can also include receiving, from the base station, configuration information comprising in indication of the CG-SDT resource via RRC dedicated signaling.

In some implementations, the method can also include receiving, from the base station, configuration information comprising in indication of the RACH configuration via RRC broadcast signaling.

In some implementations, the method can be performed by a user equipment (UE).

In some implementations, the method can be performed by at least one baseband processor.

Figure 4E:
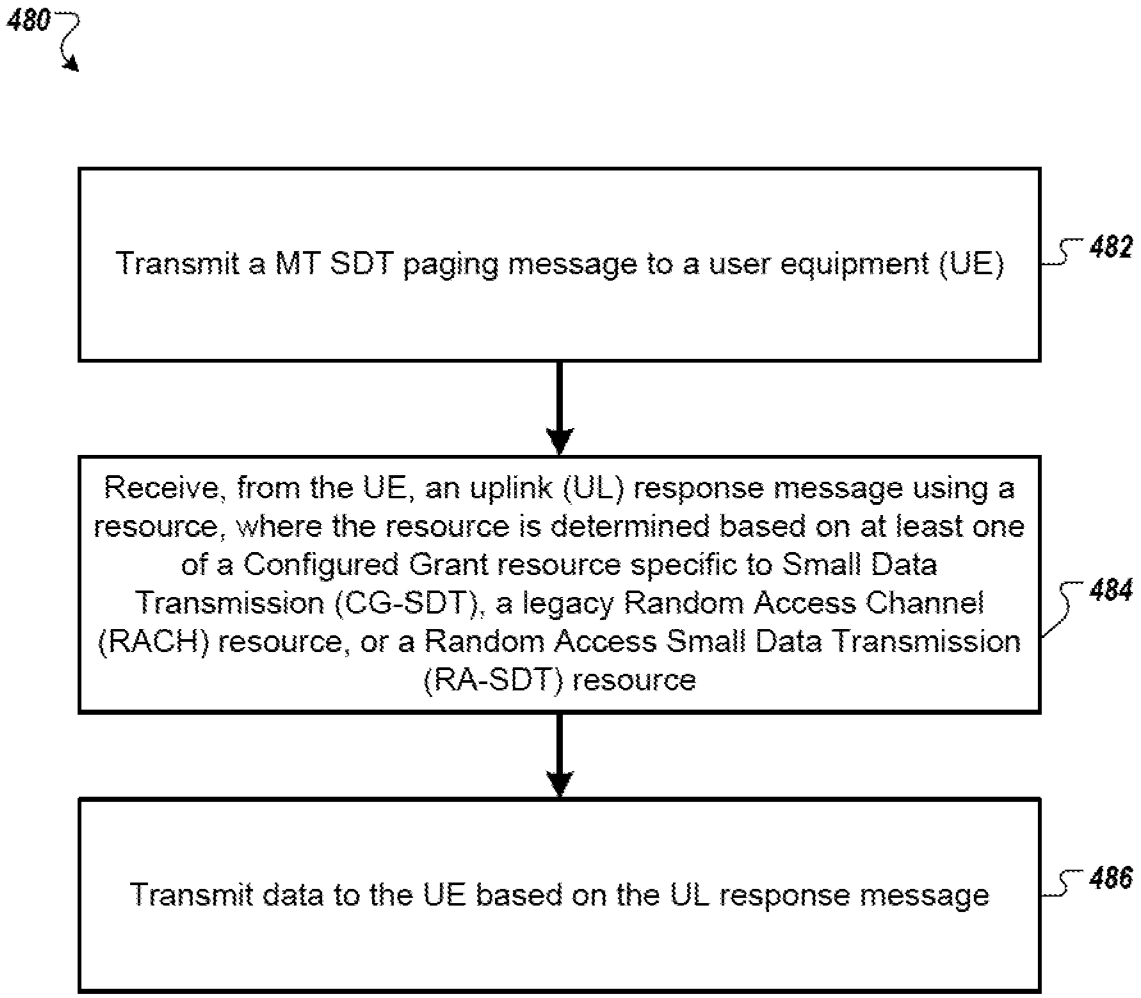

FIG. 4E illustrates a flowchart of an example method 480. For clarity of presentation, the description that follows generally describes method 480 in the context of the other figures in this description. For example, method 480 can be performed, at least in part, by the base station 104 and/or the access node 600 shown in FIGS. 1 and 6, respectively. It will be understood that method 480 can be performed, for example, by any suitable system, environment, software, hardware, or a combination of systems, environments, software, and hardware, as appropriate. In some implementations, various steps of method 480 can be run in parallel, in combination, in loops, or in any order.

According to the method 480, a device transmits a MT SDT paging message to a user equipment (UE) (block 482).

The device receives, from the UE, an uplink (UL) response message using a resource, wherein the resource is determined based on at least one of a Configured Grant resource specific to Small Data Transmission (CG-SDT), a legacy Random Access Channel (RACH) resource, or a Random Access Small Data Transmission (RA-SDT) resource (block 484).

The device transmits data to the UE based on the UL response message (block 486).

In some implementations, the CG-SDT resource can be configured, and the CG-SDT resource can be prioritized over the RACH resource as the resource.

In some implementations, the MT-SDT paging message can trigger MT-SDT only, the CG-SDT resource is not configured, and the RACH resource can be determined to be the resource.

In some implementations, the MT-SDT paging message can trigger MT-SDT, and the CG-SDT resource or the RA-SDT resource can be determined to be the resource.

In some implementations, the method can include transmitting, to the UE device, configuration information including in indication of the CG-SDT resource via RRC dedicated signaling.

In some implementations, the method can include transmitting, to the UE device, configuration information including in indication of the RACH configuration via RRC broadcast signaling.

In some implementations, the method 480 can be performed by a base station.

In some implementations, the method 480 can be performed by at least one baseband processor.

Figure 5:
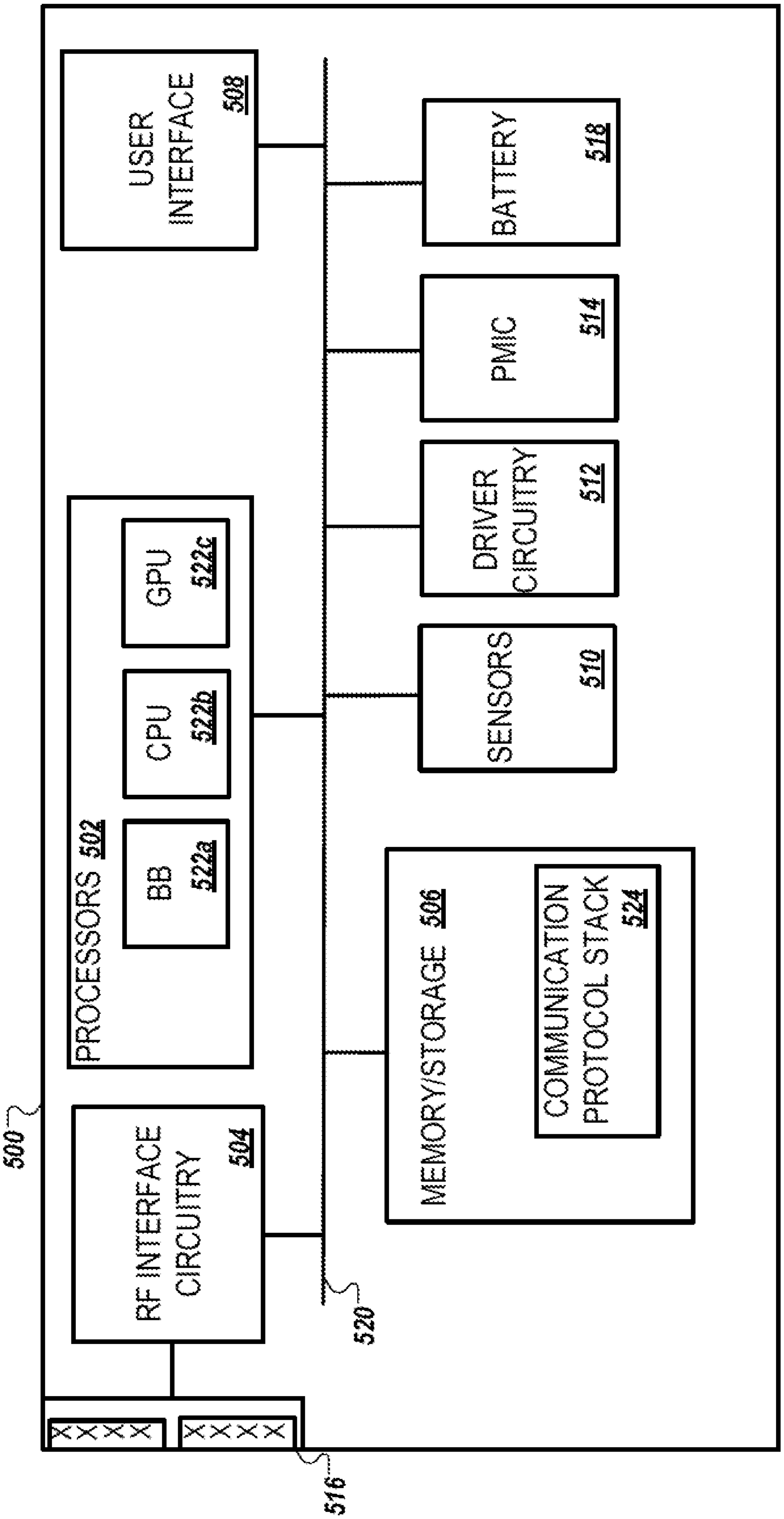
FIG. 5 illustrates an example UE.

Example Systems and Devices:

FIG. 5 illustrates a UE 500, according to some implementations. The UE 500 may be similar to and substantially interchangeable with UE 102 of FIG. 1.

The UE 500 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 500 may include processors 502, RF interface circuitry 504, memory/storage 506, user interface 508, sensors 510, driver circuitry 512, power management integrated circuit (PMIC) 514, antenna structure 516, and battery 518. The components of the UE 500 may be implemented as integrated circuits (ICs), portions thereof, discrete electronic devices, or other modules, logic, hardware, software, firmware, or a combination thereof. The block diagram of FIG. 5 is intended to show a high-level view of some of the components of the UE 500. However, some of the components shown may be omitted, additional components may be present, and different arrangement of the components shown may occur in other implementations.

The components of the UE 500 may be coupled with various other components over one or more interconnects 520, which may represent any type of interface, input/output, bus (local, system, or expansion), transmission line, trace, optical connection, etc. that allows various circuit components (on common or different chips or chipsets) to interact with one another.

The processors 502 may include processor circuitry such as, for example, baseband processor circuitry (BB) 522A, central processor unit circuitry (CPU) 522B, and graphics processor unit circuitry (GPU) 522C. The processors 502 may include any type of circuitry or processor circuitry that executes or otherwise operates computer-executable instructions, such as program code, software modules, or functional processes from memory/storage 506 to cause the UE 500 to perform operations as described herein.

In some implementations, the baseband processor circuitry 522A may access a communication protocol stack 524 in the memory/storage 506 to communicate over a 3GPP compatible network. In general, the baseband processor circuitry 522A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 504.

The baseband processor circuitry 522A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 506 may include one or more non-transitory, computer-readable media that includes instructions (for example, communication protocol stack 524) that may be executed by one or more of the processors 502 to cause the UE 500 to perform various operations described herein. The memory/storage 506 include any type of volatile or non-volatile memory that may be distributed throughout the UE 500. In some implementations, some of the memory/storage 506 may be located on the processors 502 themselves (for example, L1 and L2 cache), while other memory/storage 506 is external to the processors 502 but accessible thereto via a memory interface. The memory/storage 506 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 504 may include transceiver circuitry and radio frequency front module (RFEM) that allows the UE 500 to communicate with other devices over a radio access network. The RF interface circuitry 504 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 516 and proceed to filter and amplify (with a low-noise amplifier) the signal. The signal may be provided to a receiver of the transceiver that downconverts the RF signal into a baseband signal that is provided to the baseband processor of the processors 502.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 516. In various implementations, the RF interface circuitry 504 may be configured to transmit/receive signals in a manner compatible with NR access technologies.

The antenna 516 may include antenna elements to convert electrical signals into radio waves to travel through the air and to convert received radio waves into electrical signals. The antenna elements may be arranged into one or more antenna panels. The antenna 516 may have antenna panels that are omnidirectional, directional, or a combination thereof to enable beamforming and multiple input, multiple output communications. The antenna 516 may include microstrip antennas, printed antennas fabricated on the surface of one or more printed circuit boards, patch antennas, phased array antennas, etc. The antenna 516 may have one or more panels designed for specific frequency bands including bands in FR1 or FR2.

The user interface 508 includes various input/output (I/O) devices designed to enable user interaction with the UE 500. The user interface 508 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 500.

The sensors 510 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 512 may include software and hardware elements that operate to control particular devices that are embedded in the UE 500, attached to the UE 500, or otherwise communicatively coupled with the UE 500. The driver circuitry 512 may include individual drivers allowing other components to interact with or control various input/output (I/O) devices that may be present within, or connected to, the UE 500. For example, driver circuitry 512 may include a display driver to control and allow access to a display device, a touchscreen driver to control and allow access to a touchscreen interface, sensor drivers to obtain sensor readings of sensor circuitry 510 and control and allow access to sensor circuitry 510, drivers to obtain actuator positions of electro-mechanic components or control and allow access to the electro-mechanic components, a camera driver to control and allow access to an embedded image capture device, audio drivers to control and allow access to one or more audio devices.

The PMIC 514 may manage power provided to various components of the UE 500. In particular, with respect to the processors 502, the PMIC 514 may control power-source selection, voltage scaling, battery charging, or DC-to-DC conversion.

In some implementations, the PMIC 514 may control, or otherwise be part of, various power saving mechanisms of the UE 500. A battery 518 may power the UE 500, although in some examples the UE 500 may be mounted deployed in a fixed location, and may have a power supply coupled to an electrical grid. The battery 518 may be a lithium ion battery, a metal-air battery, such as a zinc-air battery, an aluminum-air battery, a lithium-air battery, and the like. In some implementations, such as in vehicle-based applications, the battery 518 may be a typical lead-acid automotive battery.

Figure 6:
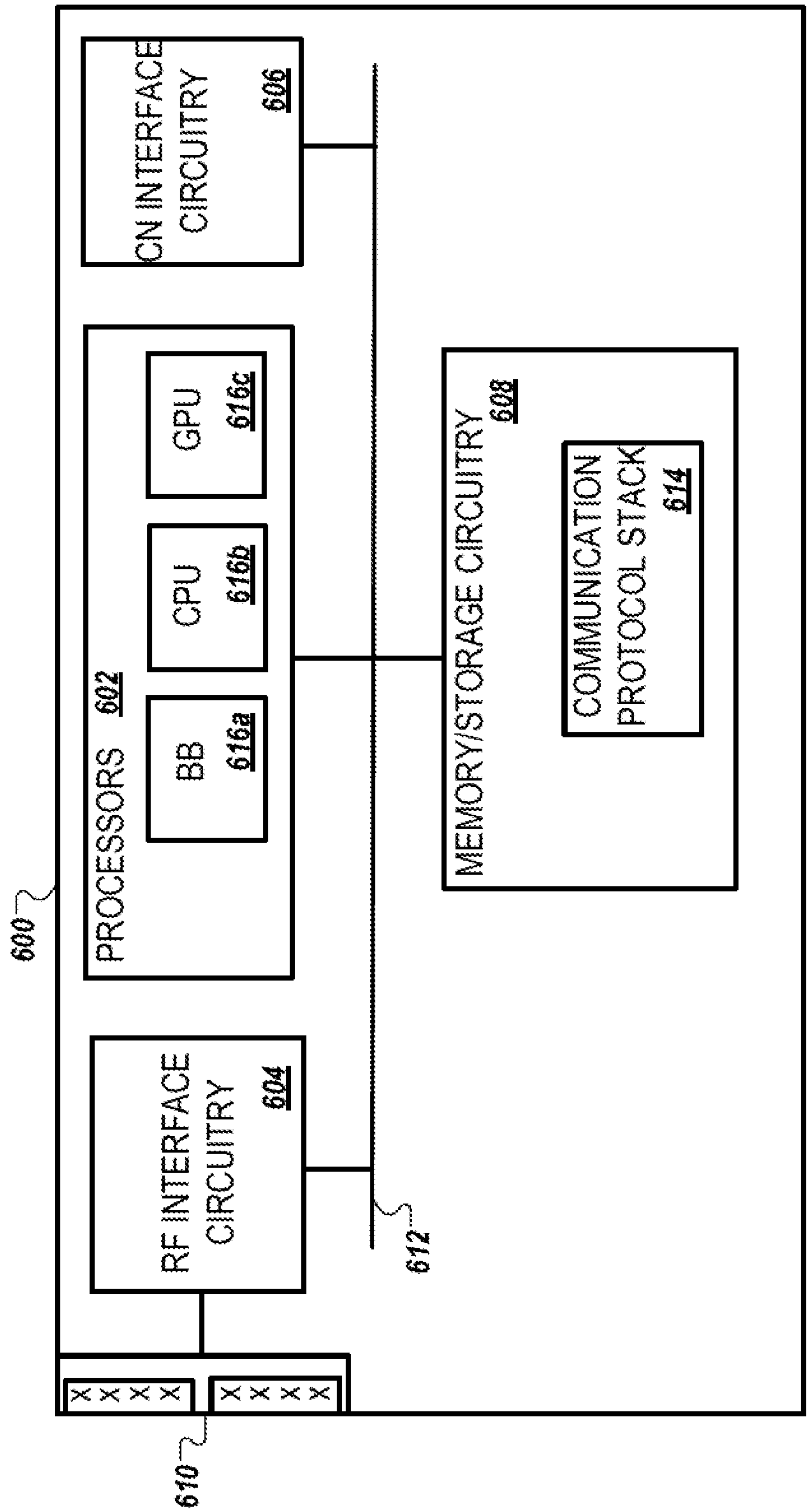
FIG. 6 illustrates an example access node.

FIG. 6 illustrates an access node 600 (e.g., a base station or gNB), according to some implementations. The access node 600 may be similar to and substantially interchangeable with base station 104. The access node 600 may include processors 602, RF interface circuitry 604, core network (CN) interface circuitry 606, memory/storage circuitry 608, and antenna structure 610.

The components of the access node 600 may be coupled with various other components over one or more interconnects 612. The processors 602, RF interface circuitry 604, memory/storage circuitry 608 (including communication protocol stack 614), antenna structure 610, and interconnects 612 may be similar to like-named elements shown and described with respect to FIG. 5. For example, the processors 602 may include processor circuitry such as, for example, baseband processor circuitry (BB) 616A, central processor unit circuitry (CPU) 616B, and graphics processor unit circuitry (GPU) 616C.

The CN interface circuitry 606 may provide connectivity to a core network, for example, a 5th Generation Core network (5GC) using a 5GC-compatible network interface protocol such as carrier Ethernet protocols, or some other suitable protocol. Network connectivity may be provided to/from the access node 600 via a fiber optic or wireless backhaul. The CN interface circuitry 606 may include one or more dedicated processors or FPGAs to communicate using one or more of the aforementioned protocols. In some implementations, the CN interface circuitry 606 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 600 that operates in an NR or 5G system (for example, a gNB), and the term "E-UTRAN node" or the like may refer to an access node 600 that operates in an LTE or 4G system (e.g., an eNB). According to various implementations, the access node 600 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 600 may be implemented as one or more software entities running on server computers as part of a virtual network, which may be referred to as a CRAN and/or a virtual baseband unit pool (vBBUP). In V2X scenarios, the access node 600 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Further Examples

In the following sections, further exemplary embodiments are provided.

Example A1 includes a method comprising: receiving, by a user equipment (UE) from a base station of a wireless network, configuration information for selecting a resource for transmitting an uplink (UL) response message from the UE to the base station; receiving, by the UE in an RRC_INACTIVE state, a Mobile Terminated Small Data Transmission (MT-SDT) paging message from the base station; determining, by the UE, whether the MT-SDT paging message includes an indication of at least one of a first resource or a first resource type for transmitting the UL response message; and performing at least one of: (i) upon determining that the MT-SDT paging message includes the indication and that one or more conditions have been satisfied, transmitting, by the UE, the UL response message to the base station using at least one of the first resource or the first resource type, (ii) upon determining that the MT-SDT paging message includes the indication and that one or more conditions for using the first resource have not been satisfied, transmitting, by the UE, the UL response message to the base station using a second resource that is selected based on configuration information, or (iii) upon determining that the MT-SDT paging message does not include the indication, transmitting, by the UE, the UL response message to the base station using the second resource selected based on the configuration information.

Example A2 includes the method of Example A1. Further, at least one of the first resource or the first resource type is one of: a legacy Random Access Channel (RACH) resource, a RACH resource specific to Small Data Transmission (RA-SDT), or a Configured Grant resource specific to Small Data Transmission (CG-SDT).

Example A3 includes the method of Example A1. Further, the second resource is one of: a legacy Random Access Channel (RACH) resource, a RACH resource specific to Small Data Transmission (RA-SDT), a Configured Grant resource specific to Small Data Transmission (CG-SDT), or a resource for transmitting data from the UE to the base station using Mobile-Originated Small Data Transmission (MO-SDT).

Example A4 includes the method of Example A1. Further, the configuration information is received by the UE from the base station via RRC dedicated signaling.

Example A5 includes the method of Example A1. Further, the configuration information is received by the UE from the base station via RRC broadcast signaling.

Example A6 includes the method of Example A1. Further, the configuration information is received from the base station via RRC dedicated signaling, and wherein the configuration information comprises an indication to select a Configured Grant resource specific to Small Data Transmission (CG-SDT) as the second resource.

Example A7 includes the method of Example A1. Further, the configuration information is received from the base station via RRC broadcast signaling, and wherein the configuration information comprises an indication to select a legacy Random Access Channel (RACH) resource as the second resource.

Example A8 includes the method of Example A1. Further, the MT-SDT paging message includes the indication of the first resource, and wherein the one or more conditions comprise a first condition that the first resource is available.

Example A9 includes the method of Example A1. Further, the MT-SDT paging message includes the indication of the first resource type, and wherein the one or more conditions comprise a second condition that a resource of the first resource type is available.

Example A10 includes the method of Example A1. Further, the configuration information comprises: an indication that the UE select the second resource based on a quality of a Synchronization Signal Block (SSB) associated with the second resource.

Example A11 includes the method of Example A1. Further, the configuration information comprises: an indication that the UE select the second resource based on a priority of resource types.

Example A12 includes the method of Example A11. Further, according to the priority of resource types, a Configured Grant resource specific to Small Data Transmission (CG-SDT) is prioritized over a legacy Random Access Channel (RACH) resource.

Example A13 includes the method of Example A11. Further, according to the priority of resource types, when the MT-SDT paging message triggers MT-SDT only, a legacy Random Access Channel (RACH) resource is selected.

Example A14 includes the method of Example A11. Further, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

Example A15 includes the method of Example A1. Further, the configuration information comprises: an indication that the UE select a legacy Random Access Channel (RACH) resource as the second resource.

Example A16 includes the method of any of Examples A1-A15. Further, the method is performed by a user equipment (UE).

Example A17 includes the method of any of Examples A1-A15. Further, the method is performed by a baseband processor.

Example B1 includes an apparatus comprising one or processors and one or more storage devices on which are stored instructions that are operable, when executed by the one or more processors, to cause the one or more processors to perform the method of any of Examples A1 to A14.

Example B2, includes the apparatus of Example B1. Further, the device is a baseband processor.

Example B3, includes the apparatus of Example B1. Further, the device is a user equipment (UE).

Example C1 includes a non-transitory computer storage medium encoded with instructions that, when executed by one or more processors, cause the one or more processors to perform the method of any of Examples A1 to A17.

Example D1 include an apparatus comprising one or more baseband processors configured to perform the method of any of Example A1 to A15.

Example E1 includes a method comprising: receiving, by a user equipment (UE) from a base station of a wireless network, configuration information for selecting a resource for transmitting an uplink (UL) response message from the UE to the base station; receiving, by the UE in an RRC_INACTIVE state, a Mobile Terminated Small Data Transmission (MT-SDT) paging message from the base station; and transmitting, by the UE, the UL response message to the base station using a first resource that is selected based on configuration information.

Example E2 includes the method of Example E1. Further, the MT-SDT paging message does not indicate a resource or a resource type for transmitting the UL response message.

Example E3 includes the method of Example E1. Further, the first resource is one of: a legacy Random Access Channel (RACH) resource, a RACH resource specific to Small Data Transmission (RA-SDT), a Configured Grant resource specific to Small Data Transmission (CG-SDT), or a resource for transmitting data from the UE to the base station using Mobile-Originated Small Data Transmission (MO-SDT).

Example E4 includes the method of Example E1. Further, the configuration information is received by the UE from the base station via RRC dedicated signaling.

Example E5 includes the method of Example E1. Further, the configuration information is received by the UE from the base station via RRC broadcast signaling.

Example E6 includes the method of Example E1. Further, the configuration information is received from the base station via RRC dedicated signaling, and the configuration information includes an indication to select a Configured Grant resource specific to Small Data Transmission (CG-SDT) as the first resource.

Example E7 includes the method of Example E1. Further, the configuration information is received from the base station via RRC broadcast signaling, and the configuration information includes an indication to select a legacy Random Access Channel (RACH) resource as the first resource.

Example E8 includes the method of Example E1. Further, the configuration information comprises: an indication that the UE select the first resource based on a quality of a Synchronization Signal Block (SSB) associated with the first resource.

Example E9 includes the method of Example E1. Further, the configuration information comprises: an indication that the UE select the first resource based on a priority of resource types.

Example E10 includes the method of Example E1. Further, according to the priority of resource types, a Configured Grant resource specific to Small Data Transmission (CG-SDT) is prioritized over a legacy Random Access Channel (RACH) resource.

Example E11 includes the method of Example E1. Further, according to the priority of resource types, when the MT-SDT paging message triggers MT-SDT only, a legacy Random Access Channel (RACH) resource is selected.

Example E12 includes the method of Example E1. Further, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

Example E13 includes the method of Example E1. Further, the configuration information comprises: an indication that the UE select a legacy Random Access Channel (RACH) resource as the first resource.

Example E14 includes the method of any of Examples E1-E13. Further, the method is performed by a user equipment (UE).

Example E15 includes the method of any of Examples E1-E13. Further, the method is performed by a baseband processor.

Example F1 includes an apparatus comprising one or processors and one or more storage devices on which are stored instructions that are operable, when executed by the one or more processors, to cause the one or more processors to perform the method of any of Examples E1 to E13.

Example F2 includes the apparatus of Example F1. Further, the apparatus is a baseband processor.

Example F3 includes the apparatus of Example F1. Further, the apparatus is a user equipment (UE).

Example G1 includes a non-transitory computer storage medium encoded with instructions that, when executed by one or more processors, cause the one or more processors to perform the method of any of Examples E1 to E15.

Example H1 includes an apparatus comprising one or more baseband processors configured to perform the method of any of Examples E1 to E13.

Example I1 includes transmitting, by a base station of a wireless network to the user equipment (UE), configuration information for selecting a resource for transmitting an uplink (UL) response message from the UE to the base station; transmitting, by the base station to the UE, a Mobile Terminated Small Data Transmission (MT-SDT) paging message, wherein the UE is in an RRC_INACTIVE state; and receiving, by the base station, the UL response message using a resource that is selected by the UE based on at least one of the configuration information or the MT-SDT paging message.

Example I2 includes the method of Example I1. Further, the method includes, upon receiving the UL response message, transmitting, from the base station, data to the UE using MT-SDT.

Example I3 includes the method of Example I1. Further, the selected resource is one of: a legacy Random Access Channel (RACH) resource, a RACH resource specific to Small Data Transmission (RA-SDT), a Configured Grant resource specific to Small Data Transmission (CG-SDT), or a resource of transmitting data from the UE to the base station using Mobile-Originated Small Data Transmission (MO-SDT).

Example I4 includes the method of Example I1. Further, the configuration information is transmitted by the base station to the UE via RRC dedicated signaling.

Example I5 includes the method of Example I1. Further, the configuration information is transmitted by the base station to the UE via RRC broadcast signaling.

Example I6 includes the method of Example I1. Further, the configuration information is transmitted to the UE via RRC dedicated signaling, and wherein the configuration information comprises an indication that the UE select a Configured Grant resource specific to Small Data Transmission (CG-SDT) as the first resource.

Example I7 includes the method of Example I1. Further, the configuration information is transmitted to the UE via RRC broadcast signaling, and wherein the configuration information comprises an indication that the UE select a legacy Random Access Channel (RACH) resource as the first resource.

Example I8 includes the method of Example I1. Further, the MT-SDT paging message includes an indication of a first resource.

Example I9 includes the method of Example I1. Further, the MT-SDT paging message includes the indication of a first resource type.

Example I10 includes the method of Example I1. Further, the configuration information comprises: an indication that the UE select the resource for transmitting the UL response message based on a quality of a Synchronization Signal Block (SSB) associated with the selected resource.

Example I11 includes the method of Example I1. Further, the configuration information comprises: an indication that the UE select the resource for transmitting the UL response message based on a priority of resource types.

Example I12 includes the method of Example I1. Further, according to the priority of resource types, a Configured Grant resource specific to Small Data Transmission (CG-SDT) is prioritized over a legacy Random Access Channel (RACH) resource.

Example I13 includes the method of Example I1. Further, according to the priority of resource types, when the MT-SDT paging message triggers MT-SDT only, the UE selects a legacy Random Access Channel (RACH) resource.

Example I14 includes the method of Example I1. Further, according to the priority of resource types, when the MT-SDT paging message triggers MT-SDT, a selection is made from among a Configured Grant resource specific to Small Data Transmission (CG-SDT) or a Random Access Small Data Transmission (RA-SDT) resource.

Example I15 includes the method of Example I1. Further, the configuration information comprises: an indication that the UE select a legacy Random Access Channel (RACH) resource for transmitting the UL response message.

Example I16 includes the method of any of Examples I1-I15. Further, the method is performed by a base station.

Example I17 includes the method of any of Examples I1-I15. Further, the method is performed by a baseband processor.

Example J1 includes an apparatus comprising one or processors and one or more storage devices on which are stored instructions that are operable, when executed by the one or more processors, to cause the one or more processors to perform the method of any of Examples I1-I15.

Example J2 includes the apparatus of Example J1. Further, the apparatus is a baseband processor.

Example J3 includes the apparatus of Example J1. Further, the apparatus is a base station.

Example K1 includes a non-transitory computer storage medium encoded with instructions that, when executed by one or more processors, cause the one or more processors to perform the method of any of Examples I1-I17.

Example L1 includes an apparatus comprising one or more baseband processors configured to perform the methods of any of Examples I1-I15.

Example M1 includes a method comprising: receiving a Mobile Terminated Small Data Transmission (MT SDT) paging message from a base station of a wireless network; determining a resource for transmitting an uplink (UL) response message to the base station, based on at least one of: a Configured Grant resource specific to Small Data Transmission (CG-SDT), a legacy Random Access Channel (RACH) resource, or a Random Access Small Data Transmission (RA-SDT) resource; and transmitting the UL response message to the base station using the determined resource.

Example M2 includes the method of Example M1. Further, determining the resource comprises: determining that the CG-SDT resource is configured; and prioritizing the CG-SDT resource over the RACH resource as the resource.

Example M3 includes the method of Example M1. Further, determining the resource comprises: responsive to determining that MT-SDT paging message triggers MT-SDT only and that the CG-SDT resource is not configured, determining that the RACH resource is the resource.

Example M4 includes the method of Example M1. Further, determining the resource comprises: responsive to determining that MT-SDT paging message triggers MT-SDT, determining that the CG-SDT resource or the RA-SDT resource is the resource.

Example M5 includes the method of Example M1. Further, the method includes receiving, from the base station, configuration information comprising in indication of the CG-SDT resource via RRC dedicated signaling.

Example M6 includes the method of Example M1. Further, the method includes receiving, from the base station, configuration information comprising in indication of the RACH configuration via RRC broadcast signaling.

Example M7 includes the method of any of Examples M1-M6. Further, the method is performed by a user equipment (UE).

Example M8 includes the method of any of Examples M1-M6. Further, the method is performed by a baseband processor.

Example N1 includes an apparatus comprising one or processors and one or more storage devices on which are stored instructions that are operable, when executed by the one or more processors, to cause the one or more processors to perform the method of any of Examples M1 to M6.

Example N2 includes the apparatus of Example N1. Further, the device is a baseband processor.

Example N3 includes the apparatus of Example N1. Further, the device is a user equipment (UE).

Example O1 includes a non-transitory computer storage medium encoded with instructions that, when executed by one or more processors, cause the one or more processors to perform the method of any of Examples M1-M8.

Example P1 includes a method includes: transmitting a MT SDT paging message to a user equipment (UE); receiving, from the UE, an uplink (UL) response message using a resource, wherein the resource is determined based on at least one of: a Configured Grant resource specific to Small Data Transmission (CG-SDT), a legacy Random Access Channel (RACH) resource, or a Random Access Small Data Transmission (RA-SDT) resource; and transmitting data to the UE based on the UL response message.

Example P2 includes the method of Example P1. Further, the CG-SDT resource is configured; and wherein the CG-SDT resource is prioritized over the RACH resource as the resource.

Example P3 includes the method of Example P1. Further, the MT-SDT paging message triggers MT-SDT only, wherein the CG-SDT resource is not configured, and wherein the RACH resource is determined to be the resource.

Example P4 includes the method of Example P1. Further, the MT-SDT paging message triggers MT-SDT, and wherein the CG-SDT resource or the RA-SDT resource is determined to be the resource.

Example P5 includes the method of Example P1. Further, the method includes transmitting, to the UE device, configuration information comprising in indication of the CG-SDT resource via RRC dedicated signaling.

Example P6 includes the method of Example P1. Further, the method includes transmitting, to the UE device, configuration information comprising in indication of the RACH configuration via RRC broadcast signaling.

Example P7 includes the method of Example P1. Further, the method is performed by a base station.

Example P8 includes the method of Example P1. Further, the method is performed by at least one baseband processor.

Example Q1 includes an apparatus comprising one or processors and one or more storage devices on which are stored instructions that are operable, when executed by the one or more processors, to cause the one or more processors to perform the method of any of Examples P1 to P6.

Example Q2 includes the apparatus of Example Q1. Further, the device is a baseband processor.

Example Q3 includes the apparatus of Example Q1. Further, the device is a base station.

Example R1 includes a non-transitory computer storage medium encoded with instructions that, when executed by one or more processors, cause the one or more processors to perform the method of any of Examples P1-P8.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method comprising:

receiving a Mobile Terminated Small Data Transmission (MT-SDT) paging message from a base station of a wireless network;

determining a resource for transmitting an uplink (UL) response message to the base station, based on at least one of:

a Configured Grant resource specific to Small Data Transmission (CG-SDT), a legacy Random Access Channel (RACH) resource, or a Random Access Small Data Transmission (RA-SDT) resource, wherein determining the resource comprises:

determining that the MT-SDT paging message indicates a MT-SDT triggered resource block (RB), determining an association between the MT-SDT triggered RB and one of the CG-SDT resource, the RACH resource, or the RA-SDT resource, and selecting the resource based on the association; and transmitting the UL response message to the base station using the determined resource.

2. The method of claim 1, wherein determining the resource comprises:

determining that the CG-SDT resource is configured; and prioritizing the CG-SDT resource over the RACH resource as the resource.

3. The method of claim 1, wherein determining the resource comprises:

responsive to determining that MT-SDT paging message triggers MT-SDT only and that the CG-SDT resource is not configured, determining that the RACH resource is the resource.

4. The method of claim 1, wherein determining the resource comprises:

responsive to determining that MT-SDT paging message triggers MT-SDT, determining that the CG-SDT resource or the RA-SDT resource is the resource.

5. The method of claim 1, further comprising receiving, from the base station, configuration information comprising in indication of the CG-SDT resource via RRC dedicated signaling.

6. The method of claim 1, further comprising receiving, from the base station, configuration information comprising in indication of the RACH configuration via RRC broadcast signaling.

7. The method of claim 1, wherein the method is performed by a user equipment (UE).

8. The method of claim 1, wherein the method is performed by at least one baseband processor.

9. A non-transitory computer storage medium encoded with instructions that, when executed by one or more processors, cause the one or more processors to perform operations comprising: transmitting an MT-SDT paging message to a user equipment (UE);

receiving, from the UE, an uplink (UL) response message using a resource, wherein the resource is determined based on at least one of:

a Configured Grant resource specific to Small Data Transmission (CG-SDT), a legacy Random Access Channel (RACH) resource, or a Random Access Small Data Transmission (RA-SDT) resource, wherein determining the resource comprises:

determining that the MT-SDT paging message indicates a MT-SDT triggered resource block (RB), determining an association between the MT-SDT triggered RB and one of the CG-SDT resource, the RACH resource, or the RA-SDT resource, and selecting the resource based on the association; and transmitting data to the UE based on the UL response message.

10. The non-transitory computer storage medium of claim 9, wherein the CG-SDT resource is configured; and wherein the CG-SDT resource is prioritized over the RACH resource as the resource.

11. The non-transitory computer storage medium of claim 9, wherein the MT-SDT paging message triggers MT-SDT only, wherein the CG-SDT resource is not configured, and wherein the RACH resource is determined to be the resource.

12. The non-transitory computer storage medium of claim 9, wherein the MT-SDT paging message triggers MT-SDT, and wherein the CG-SDT resource or the RA-SDT resource is determined to be the resource.

13. The non-transitory computer storage medium of claim 9, further comprising transmitting, to the UE, configuration information comprising in indication of the CG-SDT resource via RRC dedicated signaling.

14. The non-transitory computer storage medium of claim 9, further comprising transmitting, to the UE, configuration information comprising in indication of the RACH configuration via RRC broadcast signaling.

15. The non-transitory computer storage medium of claim 9, wherein the operations are performed by a base station.

16. The non-transitory computer storage medium of claim 9, wherein the operations are performed by at least one baseband processor.

17. An apparatus comprising one or more processors and one or more storage devices on which are stored instructions that are operable, when executed by the one or more processors, to cause the one or more processors to perform operations comprising:

receiving a Mobile Terminated Small Data Transmission (MT-SDT) paging message from a base station of a wireless network;

determining a resource for transmitting an uplink (UL) response message to the base station, based on at least one of:

a Configured Grant resource specific to Small Data Transmission (CG-SDT), a legacy Random Access Channel (RACH) resource, or a Random Access Small Data Transmission (RA-SDT) resource, wherein determining the resource comprises:

determining that the MT-SDT paging message indicates a MT-SDT triggered resource block (RB), determining an association between the MT-SDT triggered RB and one of the CG-SDT resource, the RACH resource, or the RA-SDT resource, and selecting the resource based on the association; and transmitting the UL response message to the base station using the determined resource.

* * * * *